April 14, 1970

R. C. FERGASON 3,505,799

MOISTENER FOR COTTON PICKING SPINDLES OF COTTON HARVESTER

Filed Sept. 29, 1967

April 14, 1970     R. C. FERGASON     3,505,799
MOISTENER FOR COTTON PICKING SPINDLES OF COTTON HARVESTER Filed Sept. 29, 1967     5 Sheets-Sheet 2

Inventor
Rector C. Fergason
By Robert C. Sullivan
Attorney

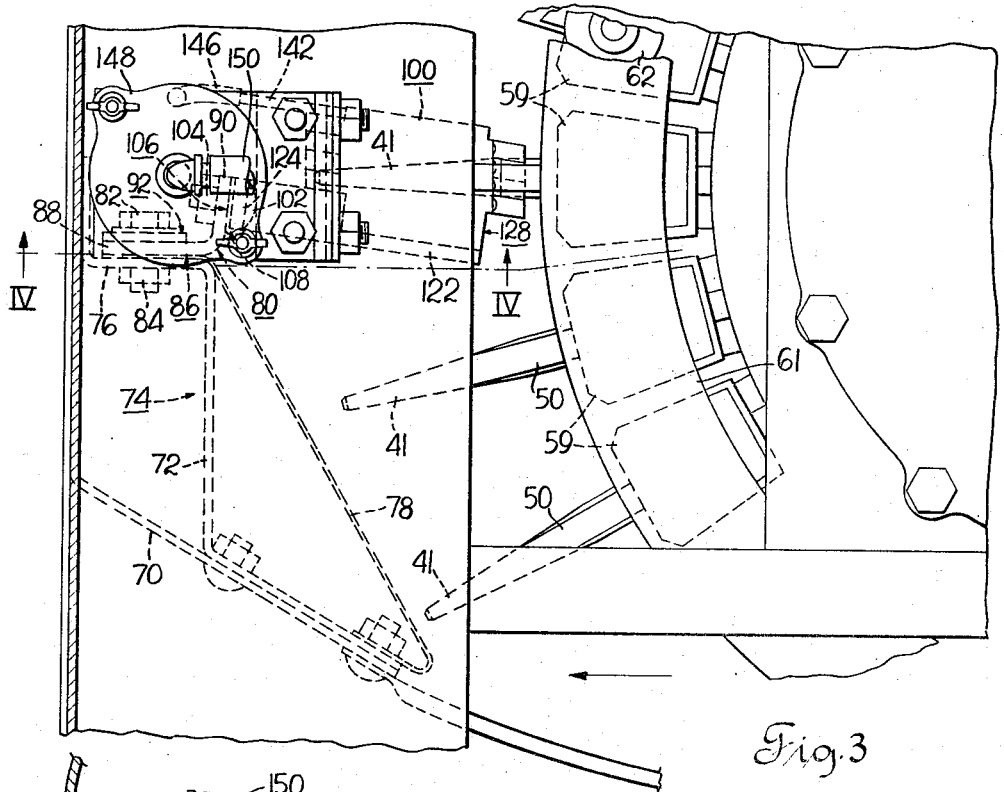
Fig. 3
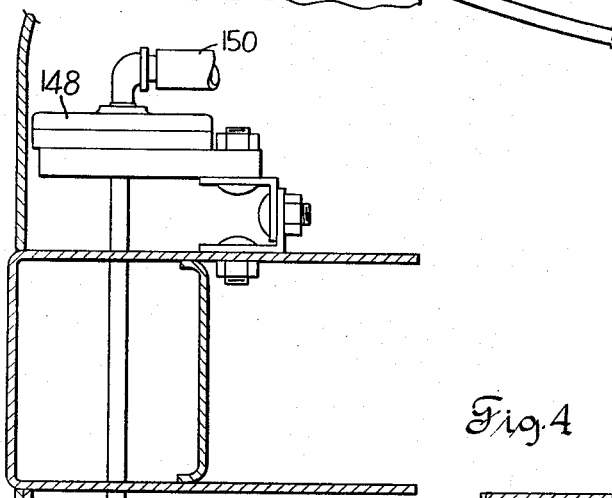
Fig. 4
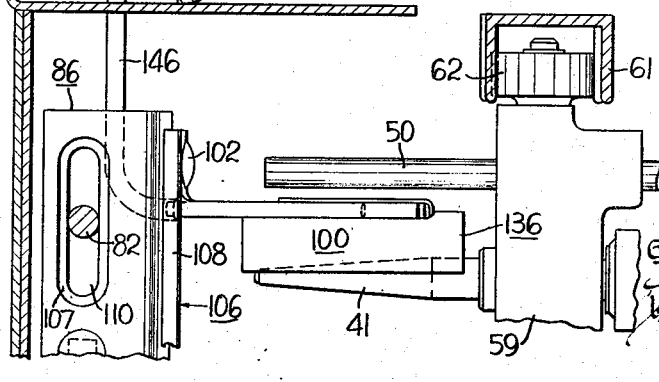
Inventor
Rector C. Fergason
By Robert C. Sullivan
Attorney April 14, 1970  R. C. FERGASON  3,505,799
MOISTENER FOR COTTON PICKING SPINDLES OF COTTON HARVESTER
Filed Sept. 29, 1967  5 Sheets-Sheet 5

Inventor
Rector C. Fergason
By Robert C. Sullivan
Attorney

United States Patent Office 3,505,799
Patented Apr. 14, 1970

3,505,799
MOISTENER FOR COTTON PICKING SPINDLES OF COTTON HARVESTER
Rector C. Fergason, Gadsden, Ala., assignor to Allis-Chalmers Manufacturing Company, Milwaukee, Wis.
Filed Sept. 29, 1967, Ser. No. 671,688
Int. Cl. A01d 45/18
U.S. Cl. 56—41                    2 Claims

ABSTRACT OF THE DISCLOSURE

A moistening apparatus for the rotating cotton picking spindles of a cotton harvester in which a plurality of vertically spaced moistening devices are carried by a support bracket assembly mounted adjacent the path of movement of the cotton picking spindles. The support bracket assembly is vertically and horizontally adjustable. The moistening device includes a mounting arm secured to the mounting bracket, an attaching clip secured to the mounting arm, and a plurality of wick elements formed of rubber or the like detachably secured to the attaching clip by support rods which pass through holes in the attaching clip and the wick elements. A water supply tube is attached to the mounting clip and distributes water to the wick elements.

---

This invention relates to a moistener mechanism for the rotating cotton picking spindles of a cotton harvester, and more particularly to a moistener mechanism having an improved low cost moistener wick and including means for effecting the collective adjustment of a plurality of such wicks.

The moistening mechanism normally used on a cotton harvester includes an upright member having a series of fluid conduits which feed through arms extending laterally from the upright member into moistener pads at the ends of the arms. The pads are normally positioned above the picking spindles of a picking unit so that as the drum rotates about its vertical axis the rotating spindles will contact the underside of the moistener pads. The moistening pads are needed to clean the plant juices from the spindles and to provide a film of fluid on the spindles to increase the picking efficiency of the harvester.

The moistening pads which are engaged by the spindles rotating therepast are subject to wear, requiring adjustment and eventual replacement.

Accordingly it is an object of this invention to provide an improved moistener mechanism for the rotating picking spindles of a cotton harvester.

It is another object of this invention to provide an improved moistening mechanism for the rotating spindles of a cotton harvester in which the moistener wicks are collectively adjustable in both vertical and horizontal directions for initial adjustment to compensate for wear. It is a further object of the invention to provide a moistening mechanism for the rotating spindles of a cotton harvester including low cost wick elements which are easily replaced or serviced.

Further objects and advantages of the invention will become apparent from the following description taken in conjunction with the accompanying drawings in which:

FIG. 3 is a plan view of the righthand picking unit of a cotton harvester showing the moistener manifold and moistening wick;

FIG. 4 is a view taken on line IV—IV of FIG. 3;

Figure 1:
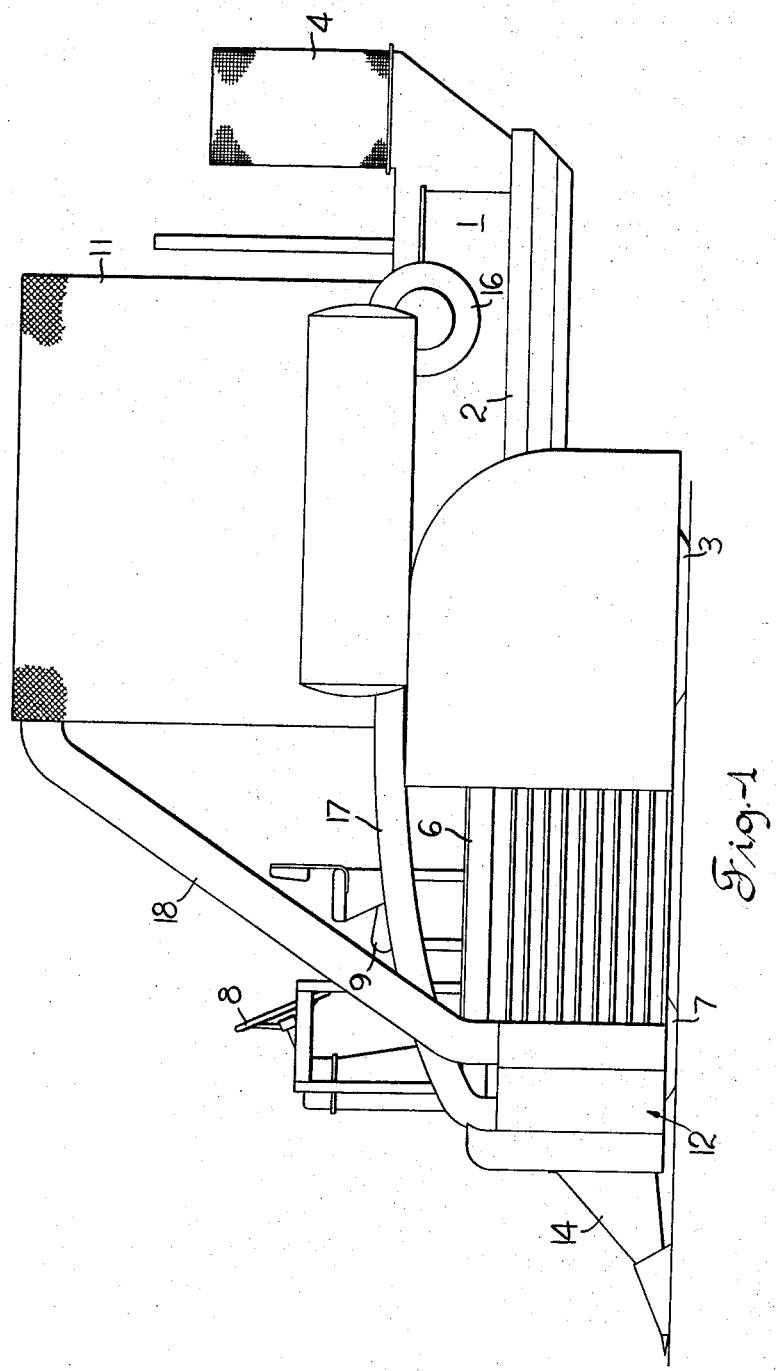
FIG. 1 is a side elevation view of a drum type cotton harvester.

Referring to FIG. 1, the cotton harvester embodying the invention consists of an engine 1 joined to an axle housing (not shown) and supported thereby as a cantilever beam. A frame member 2 supports engine 1 from the axle housing. A pair of laterally spaced traction wheels 3 (only one is shown) are operatively connected to the opposite ends of the axle housing in a conventional manner. Engine 1 is provided with an air intake cleaning screen 4 which is carried by the engine. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 6 and 2 rearwardly of operator's seat 9. Cotton picker assemblies 12 are mounted on each side of the forward end of frame 6. These assemblies are carried by a subframe 13 (see FIG. 2) which is adjustably connected to frame 6 for vertical movement relative thereto. The forward end of assemblies 12 (see FIG. 1) are provided with plant dividers 14 which guide cotton plants into contact with cotton pickers which are positioned just rearwardly of the plant dividers. If further details of the stalk dividers are desired, reference may be had to U.S. patent application Ser. No. 456,399, now United States Patent 3,380,233, filed May 17, 1965 for Plant Divider for Harvesters. Frame 2 supports a blower 16 which is provided with a duct 17 which delivers pressurized air to picking assembly 12 and a cotton delivering duct 18 for depositing picked cotton into basket 11.

Figure 2:
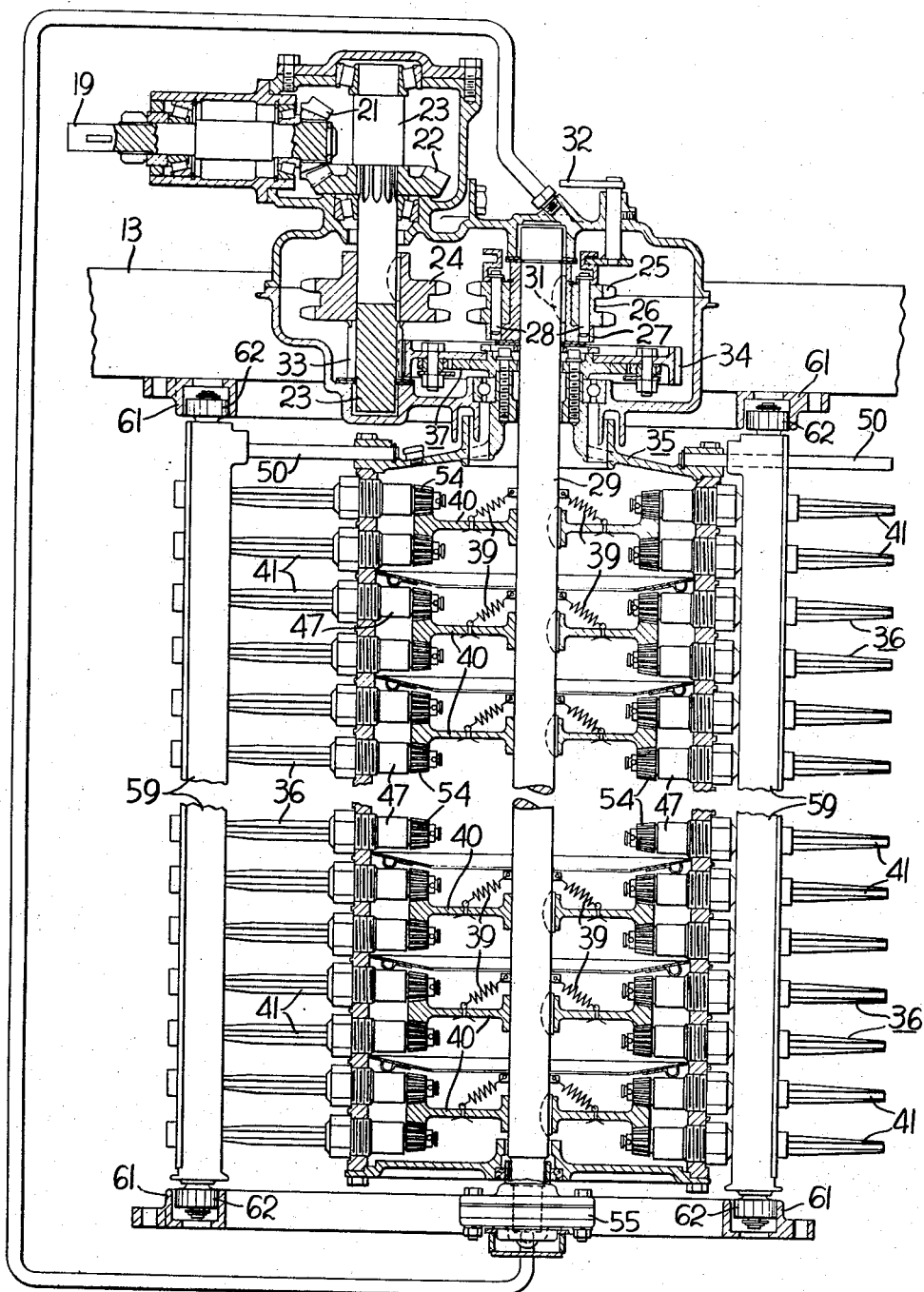
FIG. 2 is a view in cross section of a portion of a drum type harvester embodying the invention.

Engine 1 is provided with a power takeoff shaft (not shown) which is operatively connected to shaft 19 of picking unit 12 (see FIG. 2). A gear 21 is attached to shaft 19 for rotation therewith and gear 21 is drivingly engaged with gear 22 attached to shaft 23. A double sprocket 24 attached to shaft 23 is drivingly connected to double sprocket 25 by means of chains (not shown). Double sprocket 25 includes a center portion 27 upon which the outer portion 26 is journaled. These two portions 26 and 27 are selectively joined together by means of pins 28. Center portion 27 is keyed to shaft 29 for rotation therewith by conventional means such as half-moon key 31. Pins 28 can be raised vertically by raising handle 32 and the mechanism connected therewith to interrupt the driving connection between portions 26 and 27.

Beneath sprocket 24 a gear 33 is attached to shaft 23. Gear 33 is drivingly engaged with a gear 34 which surrounds shaft 29 and which rotates relative thereto and gear 34 is attached to drum 35 for rotation therewith. A ratchet mechanism 37 is interposed between drum 35 and gear 34 so that drum 35 can only be driven in one direction. If driven in the opposite direction, the ratchet mechanism interrupts the drive.

Reference numeral 35 designates the drum or cylinder of a cotton picking machine and which drum carries a plurality of cotton picking assemblies 36. Each picking assembly 36 includes a picking spindle 41. Pairs of horizontal rows of spindles 41 are driven by a double bevel gear 40 secured to drive shaft 29 by means of key 38, the radially inner end of each spindle being provided with a beveled pinion gear 54 which mates with gear 40. Springs 39 suspend gears 40 from shaft 29 and half-moon keys 38 permit gears 40 to be self-aligning. By not having the weight of the gears supported on the lower of the pair of spindles, backlash problems in the gears are eliminated.

The spindle assembly 36 (see FIG. 2) includes a picking spindle 41 having an inner shank portion and a tapered picker portion. A tubular support 47 is assembled on the spindle shank portion. Beveled pinion gear 54 is positioned on the after end of spindle 41 and drives the spindle by means of a frangible roll pin with such roll pin being received in aligned openings in the spindle and gear. The outer surface of tubular support 47 is threaded so that spindle assemblies 36 can be securely received by corresponding threaded openings in the drum 35. Oil for lubrication of the gears and bearings is furnished by pump 55 (see FIG. 2) which pumps oil to the upper portion of the drum, thereafter permitting same to return to the pump by action of gravity. Pump 55 is operatively connected to the lower end of shaft 29 for rotation therewith.

A stripper bar or slat 59 (FIG. 2) is associated with each vertical row of spindles on the drum 35 and is supported from the drum by means of radial rods 50 upon which the slats 59 are slidably mounted. A pair of vertically spaced stationary cam tracks 61 carried by means of frame 13 at the upper end and by means (not shown) at the lower end are arranged to receive rollers 62 carried by the stripper bars and to cause movement of the stripper bar longitudinally of the spindles during rotation of the drum.

For further details of the spindle assembly and of the stripper mechanism with which it cooperates, reference is made to my United States patent application Ser. No. 656,811, filed July 28, 1967, for a Cotton Harvester.

Referring now particularly to FIGS. 3 and 4, the inner or left side of the picking tunnel opening, as viewed from the front of the machine includes a front vertical panel member 70 and a formed inner panel member 72 which are rigidly bolted together to form a box section generally indicated at 74. The side of the inner panel member 72 which forms the rear wall 76 of box section 74 defines a mounting surface having three vertically spaced openings therein provided with weld-nuts 84. A shield 78 a mounting bracket assembly generally indicated at 80 are adjustably secured to the near wall 76 by means of bolts 82 received by the internally threaded weld-nuts 84.

Figure 5:
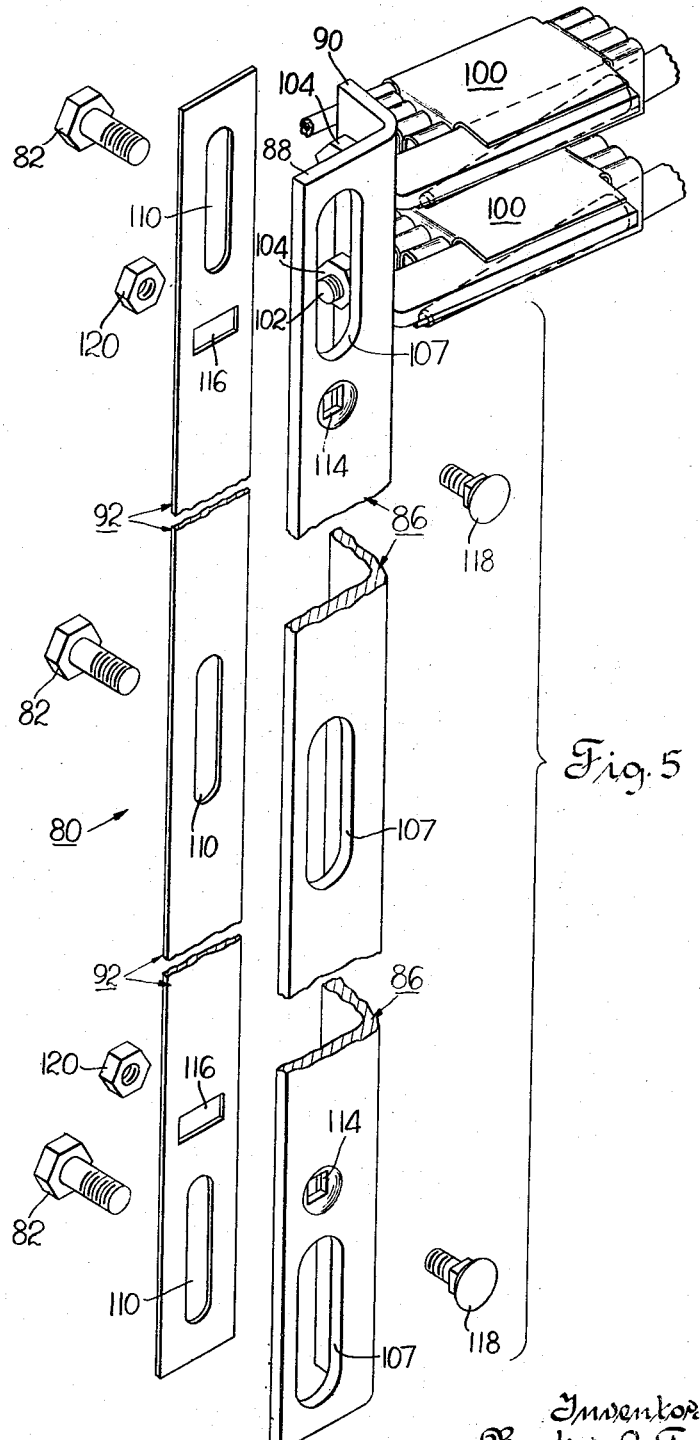
FIG. 5 is an exploded isometric view of the guide bar and wick mounting bracket of the invention.

As best seen in the view of FIG. 5, the vertical mounting bracket assembly which supports the plurality of moistener assemblies adjacent the path of movement of cotton picking spindles 41 comprises a bracket generally indicated at 86. Bracket 86 is of angle shape, including legs 88 and 90. Leg 88 lies in facing abutting relation to rear wall 76 of box section 74. A guide member 92, to be described in more detail hereinafter, lies in facing abutting relation to leg 88 or bracket 86. The leg 90 of the bracket 86 supports a plurality of vertically arranged moistener assemblies generally indicated at 100, the details of which will be described later. Each moistener assembly 100 includes a vertical mounting arm 124 (FIG. 6) which is secured to bracket leg 90 by means of a bolt and nut 102 and 104, respectively (FIG. 5). A guide bar generally indicated at 106 (FIG. 3) and including a laterally bent lip portion 108 is interposed between the moistened assemblies 100 and the facing surface of bracket leg 90 to properly align the moistening assemblies 100 and to prevent inadvertent rotation of the moistening assemblies about the axis of the mounting bolts 102. The leg 88 of the mounting bracket 86 is provided with elongated slots 107, three in the example shown, and corresponding elongated slots 110 are provided in the guide member 92, the elongated slots 110 being of narrower width than the slots 107 and being just of sufficient width to receive the bolts 82 which secure the bracket assembly to the wall 76 of box section 74. The leg 88 of bracket 86 is provided with square countersunk openings 114, and the guide member 92 is provided with elongated horizontal slots 116. Bracket 86 and the guide member 92 are secured in a fixed adjusted lateral position with respect to each other by means of bolts 118 which pass through the square countersunk openings 114 and through the horizontal slots 116 of guide member 92 and are secured by nuts 120. The bracket 86 and guide member 92 are secured to the wall 76 by means of bolts 82 which pass through the vertical slots 110 and 107 and engage the weld nuts 84 on the opposite surface of wall 76.

To effect vertical adjustment of the bracket assembly comprising the bracket 86 and the guide member 92, the bolts 82 are loosened with respect to the weld-nuts 84 on wall member 76, and the bracket and guide members 86 and 92 are vertically adjusted as a unit for initial assembly and wear take-up. This vertical adjustment is accomplished without affecting the lateral adjustment of bracket 86 relative to guide member 92.

If it is desired or necessary to effect a horizontal adjustment of the moistener assemblies 100 relative to the mounting panel 76 and spindles 41, such horizontal or lateral adjustment is effected by loosening nuts 120 on bolts 118 and laterally moving the bracket 86 relative to the guide member 92, and after the desired lateral adjustment has been made, retightening the nuts 120. It will be noted that the lateral movement of bracket 86 relative to the bolts 82 is permitted by the fact that the elongated slots 107 in the bracket 86 are of greater width than the diameter of bolts 82.

Figure 6:
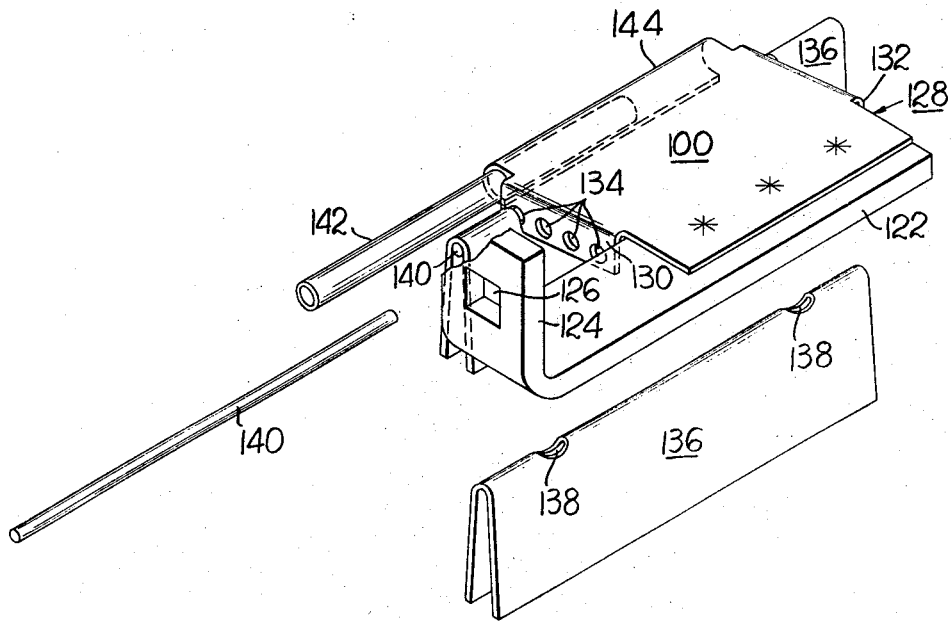
FIG. 6 is an exploded isometric view of the moistening wick assembly.
Figure 7:
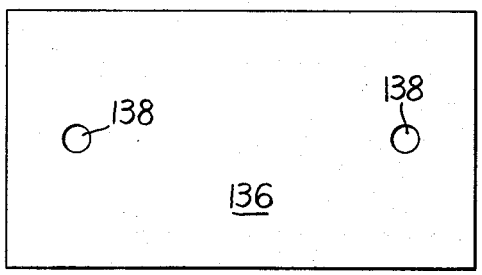
FIG. 7 is a plan view of one of the wick elements.

As best seen in the view of FIG. 6, each of the moistener assemblies generally indicated at 100 includes an arm 122 formed of a piece of metal strip or the like and having an upwardly bent portion 124 with a bolt hole 126 therethrough by means of which the moistener assembly is secured to the leg 90 of the bracket 86. An attaching clip generally indicated at 128 is rigidly welded to the upper horizontal surface of arm 122. The attaching clip 128 extends to the rear of arm 122 with respect to the mounted orientation of the moistener assembly as seen in FIG. 3 and is provided with downwardly turned ends 130 and 132, respectively, having holes 134 drilled or otherwise formed therein. Four wick members, each generally indicated at 136, are provided in the illustrated embodiment for each moistener assembly. Each wick is folded on itself 180 degrees as best seen in FIG. 6 and each wick is provided with a pair of holes 138 in the bight portion thereof for receiving the wick attaching rods 140. The holes 138 of each wick 136 are so positioned as to be in overlapping relation to the holes 134 of the downwardly bent portions 130 of support clip 128. In attaching one of the wicks to the support clip, the wick is positioned with the holes 138 of the wick in the overlapped relation to the holes 134 of bent portion 130 as just described and the rod 140 is then inserted through the registering holes 138, 134 of the wick and clip at first one end and then at the opposite end of the support clip.

A water supply tube 142 is positioned within and soldered or otherwise secured to the folded longitudinal edge 144 of clip 128. The water supply tube 142 of each moistener assembly is connected by means of a tube such as 146 (FIG. 4) to a water supply manifold 148 which in turn is connected as by means of conduit 150 to a storage tank, not shown, from which the moistening water is pumped to the manifold 148.

The water from the supply tube 142 of each moistener assembly passes outwardly and downwardly over the wicks 136 which, as best seen in FIG. 4, are in wiping contact with the cotton picking spindles 41.

It can be seen from the foregoing that there is provided in accordance with this invention an improved moistener mechanism for the rotating cotton picking spindles of a cotton harvester in which all the moisteners are mounted on a single bar for vertical adjustment and also for horizontal adjustment. Furthermore the moistener elements are formed of a low cost, long wearing material such as rubber or equivalent elastomeric material and are mounted in such a manner that they may be easily and quickly replaced.

It is obvious from the foregoing description and drawings that the detailed arrangement and construction of the various elements may be modified considerably without departing from the spirit of the invention which must not The embodiments of the invention in which an exclusive property or privilege is claimed are defined as follows:

1. In a cotton harvester having a plurality of cotton picking spindles mounted thereon, rotatable support means mounting said spindles in vertically spaced relation to each other for movement into engagement with cotton to be picked, a stationary support means positioned adjacent said rotatable support means, a support bracket assembly mounted on said stationary support means adjacent the path of movement of said spindles, a plurality of spindle moistener assemblies positioned on said support bracket assembly at horizontal levels corresponding substantially to the vertically spaced spindles, whereby each spindle is moistened by a spindle moistener assembly as it passes said support bracket assembly during movement of said rotatable support means, said support bracket assembly including a bracket member for supporting said moistener assemblies and a guide member positioned contiguous said bracket member, means for securing said bracket member and said guide member in superposed relation to said stationary support means including first aperture means carried by the respective members for effecting vertical adjustment thereof and second aperture means carried by the respective members for effecting horizontal adjustment thereof, first fastener means passing through the first aperture means of the respective members and vertically adjustably securing said members to said stationary support means, and second fastener means passing through the second aperture means of the respective members and horizontally adjustably securing said bracket member to said guide member and to said stationary support means.

2. A moistener assembly for the spindles of a cotton harvesting machine of the type in which said spindles are mounted on a rotatable support means in vertically spaced relation to each other for movement into engagement with cotton to be picked, comprising a support bracket assembly adapted to be secured to a stationary support means on the cotton harvesting machine adjacent the path of movement of said spindles, a plurality of spindle moistener assemblies positioned on said support bracket assembly at horizontal levels corresponding substantially to the horizontal levels of said spindles, whereby each spindle is moistened by a spindle moistener assembly as it passes said support bracket assembly during movement of said rotatable support means, said support bracket assembly including a bracket member for supporting said moistener assemblies and a guide member positioned contiguous said bracket member, means for securing said bracket member and said guide member in superposed relation to said stationary support means including first aperture means carried by the respective members for effecting vertical adjustment thereof and second aperture means carried by the respective members for effecting horizontal adjustment thereof, first fastener means passing through the first aperture means of the respective members and vertically adjustably securing said members to said stationary support means, and second fastener means passing through the second aperture means of the respective members and horizontally adjustably securing said bracket member to said guide member and to said stationary support means.

References Cited

UNITED STATES PATENTS

| | | | |
|---|---|---|---|
| 1,747,566 | 2/1930 | Berry | 56—14 |
| 2,369,708 | 2/1945 | Baker et al. | 401—261 |
| 2,711,066 | 6/1955 | Barbknecht | 56—41 |
| 3,004,376 | 10/1961 | Hubbard | 56—41 |
| 3,066,467 | 12/1962 | Barfield | 56—44 |

RUSSELL R. KINSEY, Primary Examiner